(12) United States Patent
Traczek et al.

(10) Patent No.: US 11,312,228 B2
(45) Date of Patent: Apr. 26, 2022

(54) TANK ADAPTER

(71) Applicant: R.W. Beckett Corporation, North Ridgeville, OH (US)

(72) Inventors: Jeffrey Robert Traczek, Sandusky, OH (US); Christopher Allen Fildes, North Ridgeville, OH (US); Timothy Ryan Brewster, Springfield, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 421 days.

(21) Appl. No.: 16/397,112

(22) Filed: Apr. 29, 2019

(65) Prior Publication Data

US 2020/0340846 A1 Oct. 29, 2020

(51) Int. Cl.
*B60K 15/03* (2006.01)
*G01F 23/296* (2022.01)

(52) U.S. Cl.
CPC ............ *B60K 15/03* (2013.01); *G01F 23/296* (2013.01); *B60K 2015/03217* (2013.01)

(58) Field of Classification Search
CPC ...................... B60K 15/03; B60K 2015/03217
USPC ................................................ 220/601, 661
See application file for complete search history.

(56) References Cited

U.S. PATENT DOCUMENTS

| | | | | |
|---|---|---|---|---|
| 3,376,169 | A * | 4/1968 | Davis ....................... | G01K 1/14 |
| | | | | 136/230 |
| 3,922,915 | A * | 12/1975 | Andrews ............ | F02M 37/0082 |
| | | | | 73/302 |
| 2019/0001812 | A1* | 1/2019 | Moore ............... | B60K 15/0409 |
| 2019/0033119 | A1* | 1/2019 | Lease ...................... | F17C 13/02 |

* cited by examiner

*Primary Examiner* — Stephen J Castellano
(74) *Attorney, Agent, or Firm* — Eschweiler & Potashnik, LLC

(57) ABSTRACT

A tank adapter has a body with first and second ends and an axial hole. A hollow cylinder of the body has an external tapered thread from the first end toward the second end of the body. A flange between the first and second ends has a flat face extending radially outward from the hollow cylinder to a flange outer diameter. A gage mount portion has a gage mount outer diameter that is less than the flange outer diameter and extends from the second end toward the first end and has gage mounting features for securing a level gage. A gasket mates with the flat face. In a first configuration, the external tapered thread engages an internal tapered thread of a first tank opening. In a second configuration, a collar nut compresses the gasket between the flange and a top rim of a second tank opening.

20 Claims, 6 Drawing Sheets

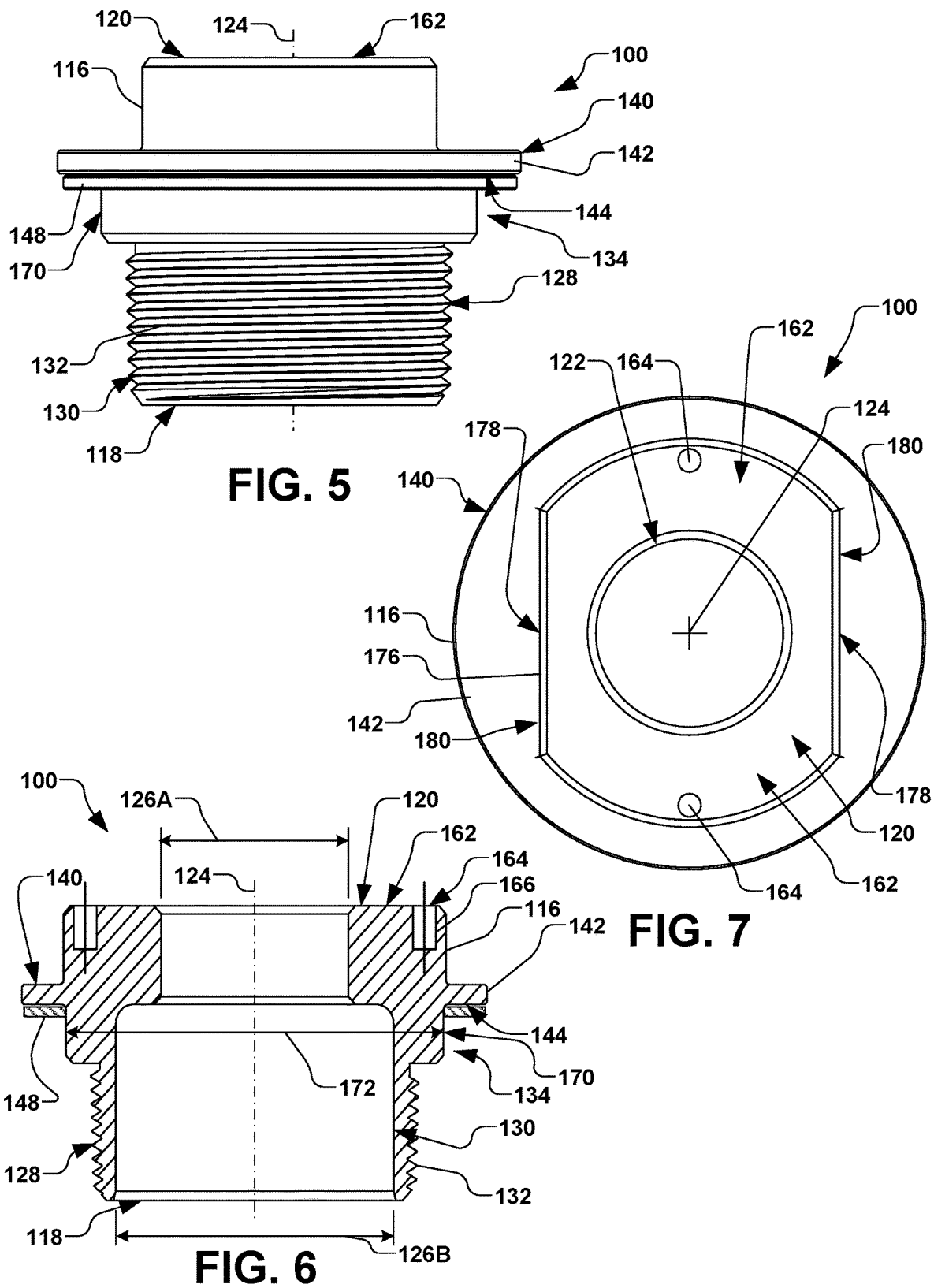

TANK ADAPTER

FIELD

The present disclosure relates generally to fluid handling components, and more specifically to an adapter for mounting a level gage to various opening configurations of a tank.

BACKGROUND

Liquid storage tanks are often used to store and supply a liquid for consumption at a remote location. In the residential heating industry, for example, fuel oil storage tanks are used to supply fuel oil to a residence for consumption in an oil furnace, whereby an indication of the level of fuel oil remaining in the storage tank is often desired to indicate a need for replenishment of fuel oil to the storage tank.

Level monitoring devices are commonly used to monitor the level of fuel oil in the storage tank. Since storage tanks are typically formed of steel or other opaque material, some level monitoring devices comprise a sensor that is coupled to a port in a top wall of the storage tank, whereby the sensor is configured to provide an indication of the level of fuel oil remaining in the storage tank. The sensor is typically coupled to an adapter, whereby the adapter engages the port in the storage tank and provides a seal between the storage tank and the sensor.

Some level sensors, such as mechanical gages, provide a visual indicator that is directly indicative of the level of fuel in the tank. Other level sensors may comprise electronic sensors, whereby the level of fuel is ascertained via various electronics and supplied to a monitoring apparatus coupled to the level sensor, such as wirelessly through radio frequency (RF) communication between the monitoring apparatus and the level sensor, or through wired connections.

Depending on locale, tank manufacturer, fuel oil provider, or other factors, several configurations of ports in the storage tank commonly exist. As such, a configuration of the adapter used to couple the level sensor to the storage tank can vary based on the configuration of the port in the tank. Conventionally, adapters are provided that are specific to the particular configuration of the ports in the tank, whereby the adapter is generally unique to the specific port configuration. When a particular level sensor is installed on a particular tank, a matching of the level sensor to the corresponding port configuration of the tank will generally determine the particular adapter needed to couple the level sensor to the tank. Such circumstances can lead to a variety of different adapters being kept on-hand by the installer, or a requisition of the particular adapter that is needed for the application may be required.

SUMMARY

The present disclosure provides a tank adapter apparatus and an associated tank adapter system for selectively securing a level gage to a plurality of differing tank openings. Accordingly, the following presents a simplified summary of the disclosure in order to provide a basic understanding of some aspects of the disclosure. This summary is not an extensive overview of the disclosure. It is intended to neither identify key or critical elements of the invention nor delineate the scope of the invention. Its purpose is to present some concepts of the disclosure in a simplified form as a prelude to the more detailed description that is presented later.

In accordance with one exemplary aspect of the disclosure, a tank adapter apparatus is provided for a plurality of opening configurations a tank. The tank adapter apparatus, for example, is configured to be selectively coupled to either of a first tank opening having an internal tapered thread and a second tank opening having an external straight thread and a top rim. The tank adapter apparatus, for example, comprises a level gage for determining a level of liquid within a tank. The level gage, for example, can comprise one of an ultrasonic level sensor, a mechanical float sensor, and an electronic sensor.

The tank adapter apparatus, for example, further comprises a body having a first end, a second end, and an axial hole extending from the first end to the second end along an axis. The body, for example, further comprises a first tank engagement portion, wherein the first tank engagement portion comprises a hollow cylinder having an external tapered thread extending from approximately the first end of the body to an intermediate location between the first and second ends of the body. Accordingly, in one example, the body is configured to be selectively coupled to the first tank opening by a first threaded engagement between the external tapered thread of the hollow cylinder and the internal tapered thread of the first tank opening.

According to another example, the body further comprises a second tank engagement portion extending radially outward from the hollow cylinder proximate to the intermediate location. The second tank engagement portion, for example, comprises a flange having a substantially flat surface facing toward the first end of the body. In one example, a gasket is configured to mate with the substantially flat surface of the flange. In one example, the gasket is comprised of a resilient material. A collar nut having an internal straight thread and a radially inwardly-protruding collar may be further provided.

Thus, in one example, the body is further configured to be selectively coupled to the second tank opening by a second threaded engagement between the internal straight thread of the collar nut and the external straight thread of the second tank opening. Furthermore, by the threaded engagement between the internal straight thread of the collar nut and the external straight thread of the second tank opening, the radially inwardly-protruding collar of the collar nut selectively compresses the gasket between the flange and a top rim of the second tank opening, thereby selectively coupling and sealing the adaptor apparatus to the second tank opening.

In accordance with another example, the body further comprises a gage mount portion associated with the second end of the body. The gage mount portion, for example, comprises one or more gage mounting features configured to selectively couple the level gage to the body. The one or more gage mounting features, for example, comprise one or more threaded holes defined in the second end of the body. In another example, the level gage comprises one or more screws operably coupled thereto whereby the one or more screws are configured to selectively engage the one or more threaded holes, respectively, thereby selectively securing the level gage to the gage mounting portion of the body.

The level gage may comprise a transducer, wherein the transducer is configured to pass through at least a portion of the axial hole in the body. In another example, the gage mount portion has a gage mount outer diameter associated therewith, wherein the gage mount diameter is less than the flange outer diameter.

According to another example, the second tank engagement portion further comprises a guide cylinder. The guide cylinder, for example, extends radially outward from the hollow cylinder to define a guide cylinder diameter, wherein the guide cylinder extends axially from the intermediate location to the flange. Accordingly, the guide cylinder diameter further provides a clearance fit with an internal diameter of the second tank opening.

In accordance with another example, one or more of the gage mount portion and second tank engagement portion comprise two or more flats extending along a respective two or more planes that are generally parallel to the axis. The two or more flats, for example, are configured to define wrench engagement portions for the selective coupling of the body to the first tank opening.

Accordingly, in a first configuration of the tank adapter apparatus, the external tapered thread is configured to selectively engage the internal tapered thread of the first tank opening, thereby selectively sealing the body to the first tank opening. Further, in a second configuration of the tank adapter apparatus, the collar nut is configured to compress the gasket between the flange and the top rim of the second tank opening, thereby selectively sealing the body to the second tank opening. As such, the same adapter apparatus may be utilized for either the first tank opening or second tank opening.

The above summary is merely intended to give a brief overview of some features of some embodiments of the present disclosure, and other embodiments may comprise additional and/or different features than the ones mentioned above. In particular, this summary is not to be construed to be limiting the scope of the present application. Thus, to the accomplishment of the foregoing and related ends, the disclosure comprises the features hereinafter described and particularly pointed out in the claims. The following description and the annexed drawings set forth in detail certain illustrative embodiments of the disclosure. These embodiments are indicative, however, of a few of the various ways in which the principles of the disclosure may be employed. Other objects, advantages and novel features of the disclosure will become apparent from the following detailed description of the disclosure when considered in conjunction with the drawings.

BRIEF DESCRIPTION OF THE DRAWINGS

FIG. 5 is a side plan view of an exemplified adaptor apparatus according to various aspects of the present disclosure.

FIG. 6 is a side cross-sectional view of an exemplified adaptor apparatus according to various aspects of the present disclosure.

FIG. 7 is a top plan view of an exemplified adaptor apparatus according to various aspects of the present disclosure.

DETAILED DESCRIPTION

Figure 1A:
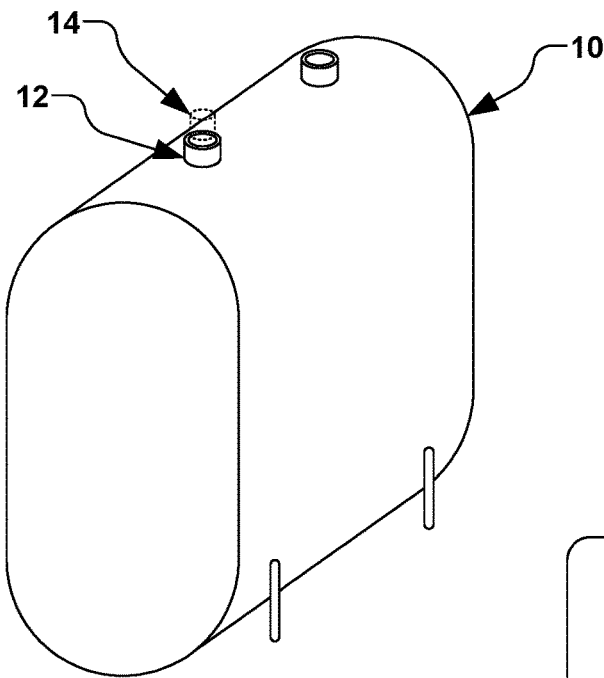
FIG. 1A is a perspective view of a conventional single-walled tank having an NPT opening.

The present disclosure is directed generally toward an apparatus and system for adapting a sensor to a fuel storage tank. Accordingly, the present disclosure will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present disclosure. It will be evident to one skilled in the art, however, that the present disclosure may be practiced without these specific details.

The present disclosure appreciates that various types of level gages (e.g., ultrasonic, mechanical float, etc.) are available on the market for providing an indication of a liquid level inside various fuel oil tanks. Typically, such level gages are selectively coupled to an opening in a top region of the fuel oil tank. The present disclosure is thus applicable to various types of level gages for various configurations of tanks, such as fuel oils tanks.

A majority of fuel oil tanks in the U.S. market comprise single-walled or double-walled tanks, whereby an opening (e.g., commonly approximately two inches in diameter) is provided on the top portion of the fuel oil tank for selectively coupling a level gage thereto. In a single-walled tank 10 shown in FIG. 1A, for example, a National Pipe Thread Tapered (NPT) opening 12 is provided for coupling the level gage 14 thereto. As shown in FIG. 1B, for example, an NPT coupler 16 having a male NPT thread 18 is configured to mate to a female NPT thread 20 of the NPT opening 12 on the fuel oil tank 10, whereby a threaded engagement between the fuel oil tank and the NPT coupler generally provides a seal between the NPT coupler and the fuel oil tank. An ultrasonic level gage 14 (or any appropriate level gage) may be further operably coupled to the NPT coupler 16 via one or more screws 22 passing through one or more respective holes 24 in a flange 26 of the ultrasonic level gage 14, and further engaging one or more respective securement holes 28 on the NPT coupler 16. Accordingly, a thru-hole 30 in the NPT coupler 16 may be utilized for determining the fluid level in the fuel oil tank 10 via the ultrasonic level gage 14.

Typically, level gages are supplied separately from fuel oil tanks. For an end user or installer wishing to implement the ultrasonic level gage 14 described above in the single-walled tank 10 of FIG. 1A, for example, an NPT kit 32 of FIG. 1B may be provided to the installer or end-user of the ultrasonic level gage. The NPT kit 32, for example, typically comprises the ultrasonic level gage 14, the NPT coupler 16, and the screws 22.

Figure 1B:
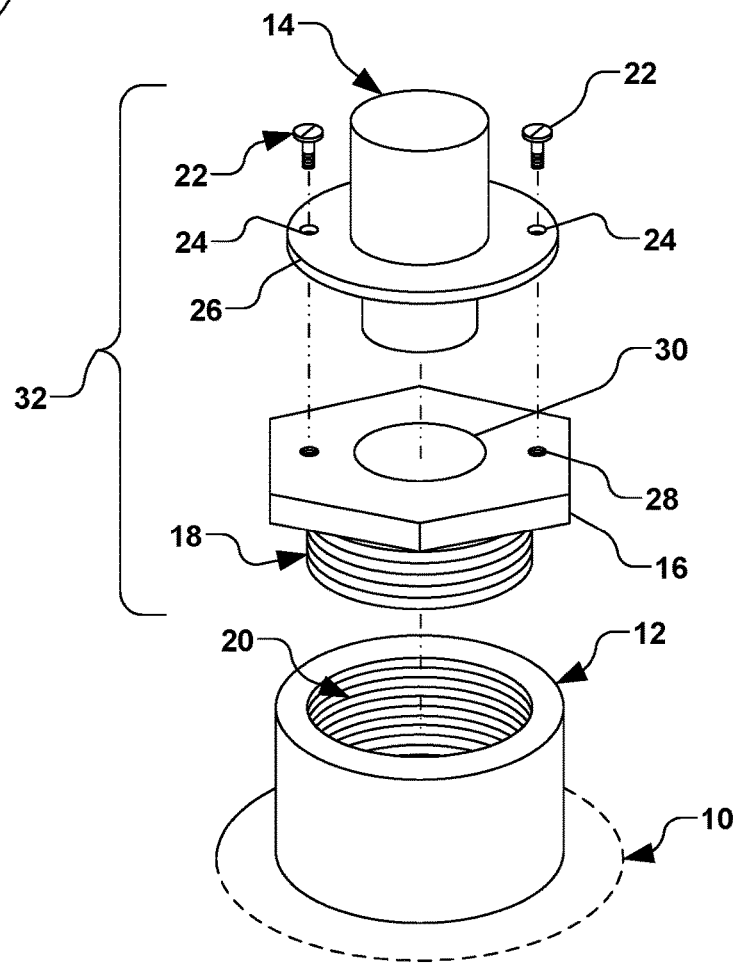
FIG. 1B is a blown-up perspective view of a conventional NPT opening and level sensor arrangement with an NPT adapter.
Figure 2A:
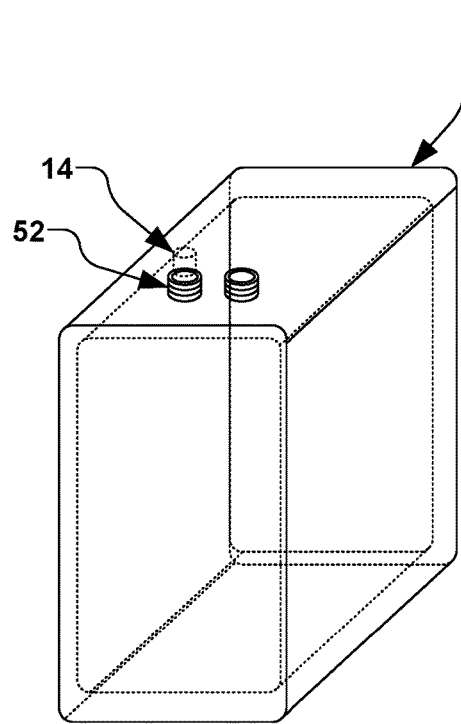
FIG. 2A is a perspective view of a conventional double-walled tank having a Euro opening.
Figure 2B:
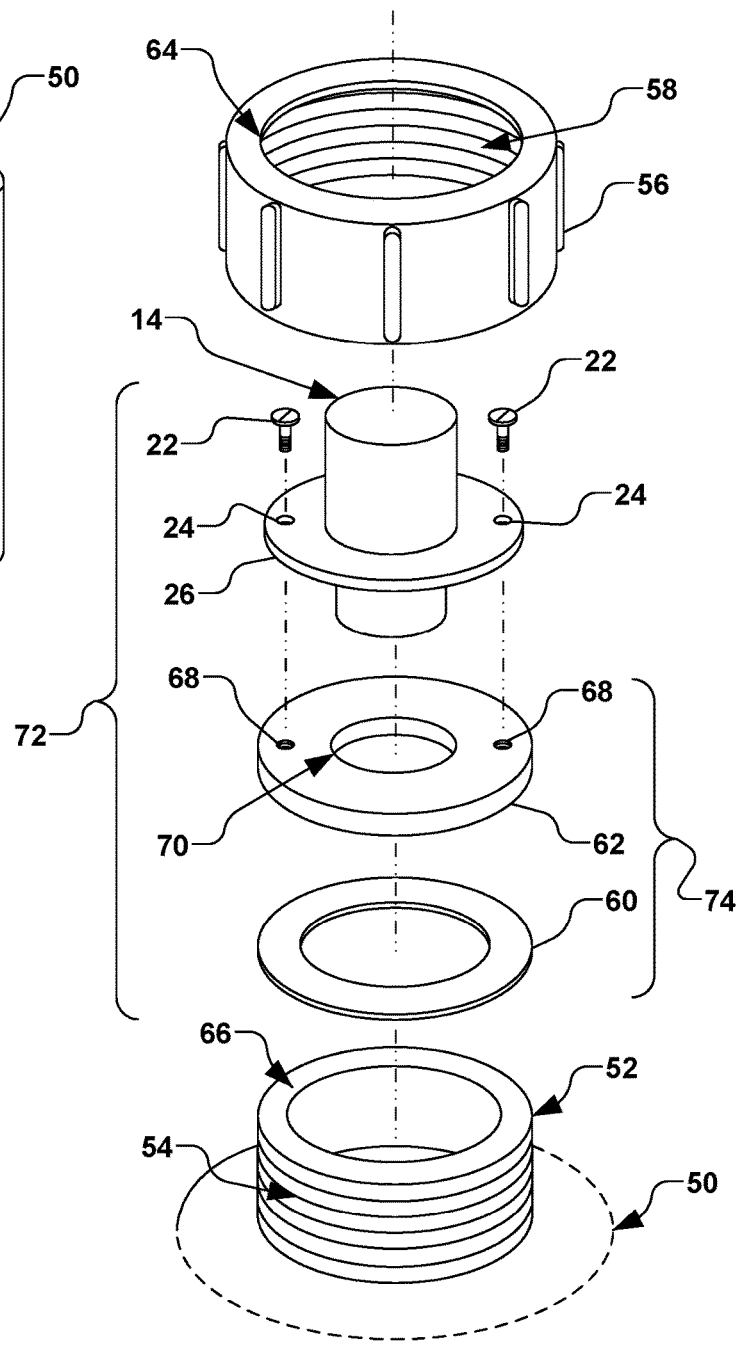
FIG. 2B is a blown-up perspective view of a conventional Euro opening and level sensor arrangement with a Euro adapter.

A growing segment in the U.S. market is moving toward the use of a double-walled tank 50, as shown in FIG. 2A. While the NPT opening 12 shown in FIG. 1B may be included in the double-walled tank 50 of FIG. 2A, many double-walled tanks may comprise a so-called Euro opening 52 associated with conformance with European standards or regulations placed on the storage and handling of combustible oils. As shown in FIG. 2B, the Euro opening 52 comprises a male straight thread 54 extended from the double-walled tank 50 for selectively coupling the ultrasonic level gage 14 thereto. A collar nut 56 having a female straight thread 58 is configured to thread onto the male straight thread 54 of the Euro opening 52, whereby a gasket 60 and support plate 62 are interposed between an engagement portion 64 of the collar nut 56 and a top rim 66 of the Euro opening 52. The flange 26 of the ultrasonic level gage 14 further is coupled to the support plate 62 via the one or more screws 22 passing through one or more respective holes 24 and engaging one or more respective securement holes 68 in the support plate.

A tightening of the collar nut 56 onto the male straight thread 54 of the Euro opening 52 further compresses the gasket 60 between the top rim 66 of the Euro opening and the collar nut, thereby generally providing a seal between the level gage 14 and the double-walled tank 50. The ultrasonic level gage 14 may be thus operably coupled to the double-walled tank 50, whereby a thru-hole 70 in the collar nut 56 may be utilized for determining the fluid level in the double-walled tank via the ultrasonic level gage.

For an end user or installer wishing to implement the ultrasonic level gage 14 in the double-walled tank 50 of FIG. 2A, for example, a Euro kit 72 of FIG. 2B may be provided to the installer or end-user of the ultrasonic level gage. The Euro kit 72, for example, comprises the ultrasonic level gage 14, the gasket 60, the support plate 62, and the screws 22.

Multiple kits (e.g., the NPT kit 32 of FIG. 1B and Euro kit 72 or Euro mod kit 74 of FIG. 2B) have been conventionally implemented for coupling the ultrasonic level gage 14 to either of the single-walled tank 10 of FIG. 1A or the double-walled tank 50 of FIG. 2A. In the U.S. market, for example, single-walled tanks 10 of FIG. 1A are most common, and the NPT kit 32 may be primarily kept on hand by installers. As such, when a double-walled tank 50 of FIG. 2A is encountered by an installer, the installer may use the NPT kit 32 of FIG. 1B, along with a Euro mod kit 74 of FIG. 2B, which includes only the support plate 62 and gasket 60. By utilizing such a Euro mod kit 74, the NPT coupler 16 of FIG. 1B is generally discarded.

The present disclosure thus seeks to eliminate previous issues with having to stock multiple kits and/or discard portions of kits, based on the type of tank to which an the ultrasonic level gage 14 is attached. Accordingly, FIGS. 3-9 provide a tank adapter 100 in various configurations. For example, in a first configuration 102 shown in FIG. 3, the tank adapter 100 is configured to couple a level gage 104 to a first tank opening 106 of a first tank 108 (e.g., the NPT opening 12 of the single-walled tank 10 of FIG. 1A). As illustrated in a second configuration 110 shown in the example of FIG. 4, the tank adapter 100 is further configured to couple the level gage 104 to a second tank opening 112 of a second tank 114 shown in FIG. 4 (e.g., the straight thread opening 52 of the double-walled tank 50 of FIG. 2A). Accordingly, the same tank adapter 100 can be utilized to couple the level gage 104 to a plurality of tank configurations (e.g., the first configuration 102 of FIG. 3 and second configuration 110 of FIG. 4), thus providing various efficiencies to manufacturing, installation, stocking or warehousing, and other considerations associated with the provision of level gages for various tanks.

As illustrated in FIGS. 5-7, for example, the tank adapter 100 comprises a body 116 having a first end 118 and a second end 120, whereby an axial hole 122 is shown in FIGS. 6-7. The axial hole 122 (e.g., a continuous through-hole) is defined from the first end 118 to the second end 120 along an axis 124. The axial hole 122, as shown in FIG. 6, for example, may be defined by varying inner diameters 126A, 126B from the first end 118 to the second end 120 of the body 116. Alternatively, although not shown, the axial hole 122 may be defined by a uniform diameter from the first end 118 to the second end 120 of the body 116.

According to one example, the body 116 comprises a first tank engagement portion 128. The first tank engagement portion 128, for example, comprises a hollow cylinder 130, wherein the hollow cylinder comprises an external tapered thread 132 (e.g., an NPT male thread), wherein the external tapered thread extends from approximately the first end 118 of the body to an intermediate location 134 between the first end and second end 120 of the body. Accordingly, the body 116 is thus configured to be selectively coupled to the first tank opening 106 of FIG. 3, for example, by a first threaded engagement 136 between the external tapered thread 132 of the hollow cylinder 130 and an internal tapered thread 138 of the first tank opening.

Figure 8:
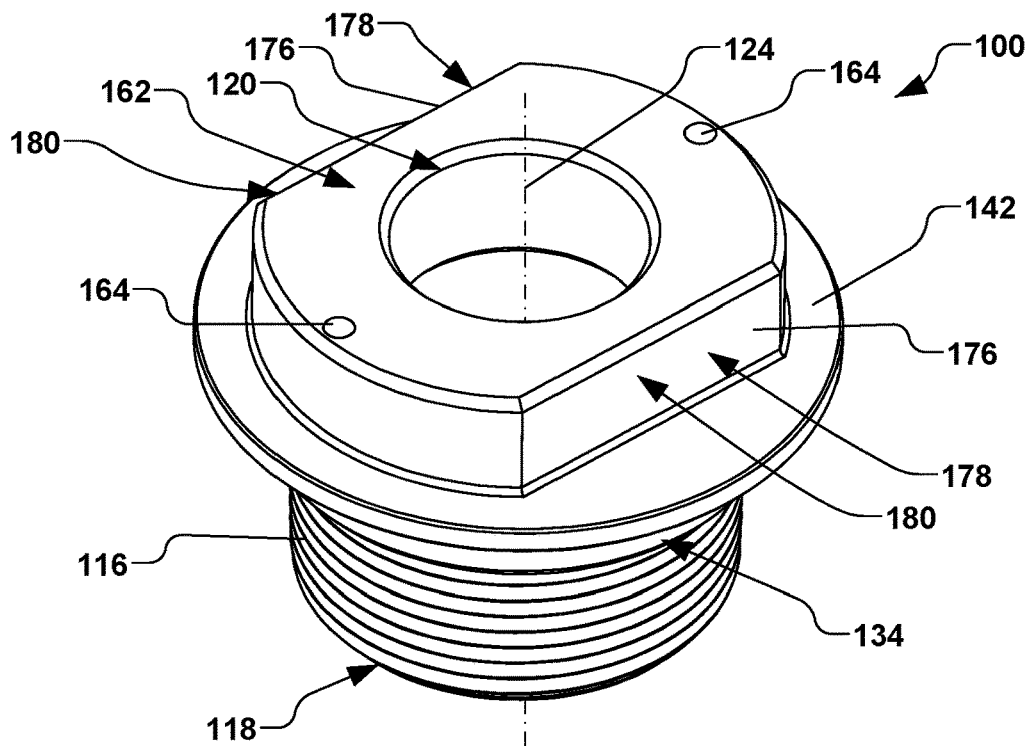
FIG. 8 is a top perspective view of an exemplified adapter according to various aspects of the present disclosure.
Figure 9:
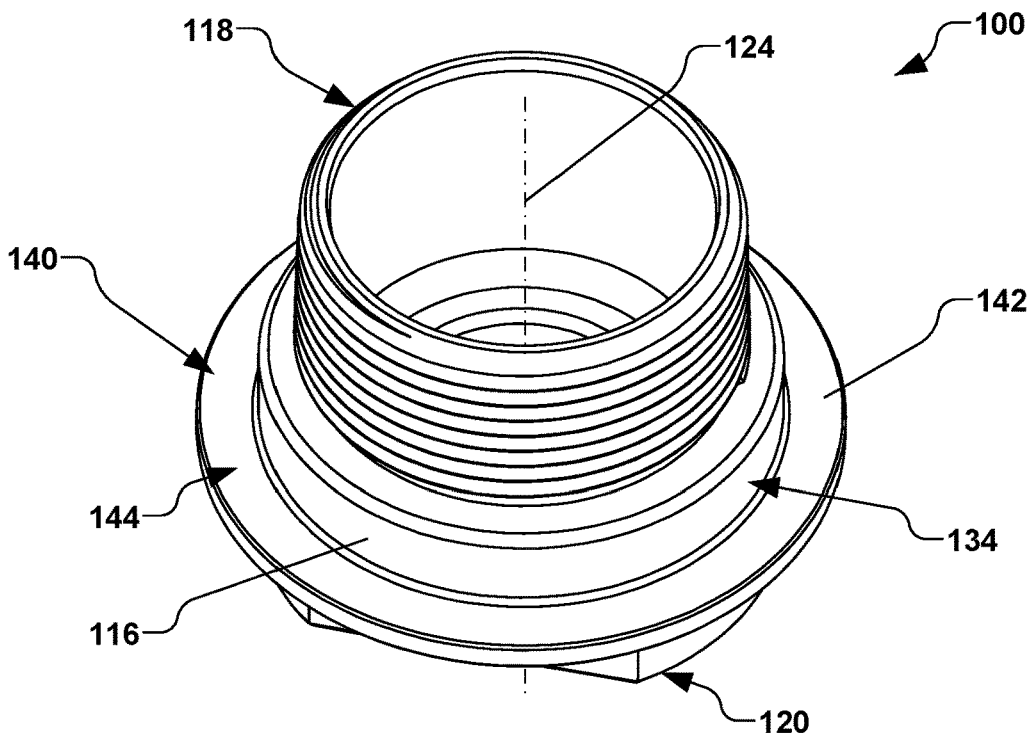
FIG. 9 is a bottom perspective view of an exemplified adapter according to various aspects of the present disclosure.

Referring again to FIGS. 5-7, in accordance with another example, the body 116 of the tank adapter 100 further comprises a second tank engagement portion 140 extending radially outward from the hollow cylinder 130 proximate to the intermediate location 134. As illustrated in FIGS. 8-9, for example, the second tank engagement portion 140 comprises a flange 142 having a substantially flat surface 144 facing toward the first end 118 of the body 116.

Accordingly, as illustrated again in FIGS. 5-6 a gasket 148 is configured to mate with the substantially flat surface 144 of the flange 142. The gasket 148, for example, is comprised of a generally resilient material such as rubber, neoprene, cork, or other any synthetic or natural material suitable for use with fuel oil. The body 116, for example, is thus further configured to be selectively coupled to the second tank opening 112 in the second configuration 110 shown in FIG. 4. In the second configuration 110, a second threaded engagement 150 selectively couples an internal straight thread 152 of a collar nut 154 and an external straight thread 156 of the second tank opening 112.

Accordingly, based on a tightening of the collar nut 154 onto the second tank opening 112, a radially inwardly-protruding collar 158 of the collar nut generally compresses the gasket 148 between the flange 142 and a top rim 160 of the second tank opening 112, thus selectively securing the tank adapter 100 to the second tank 114. It should be understood that in various alternative examples, the gasket 148 may be omitted, or be integral to one or more of the flange 142 and top rim 160 of the second tank opening 112

Further, in accordance with another exemplified aspect of the present disclosure, as illustrated in FIGS. 6-8, the body 116 further comprises a gage mount portion 162 is associated with the second end 120 of the body. The gage mount portion 162, for example, comprises one or more gage mounting features 164. The one or more gage mounting features 164, for example, may comprise one or more threaded holes 166 defined in the second end 120 of the body 116. Accordingly, the one or more gage mounting features 164 are configured to selectively couple the level gage 104 of FIGS. 3-4, for example, to the body 116. For example, the level gage 104 may further comprise one or more screws 168 operably coupled thereto, whereby the one or more screws are configured to selectively engage the one or more threaded holes 166 in the body 116, respectively, thereby securing the level gage 104 to the body.

In accordance with another example, the second tank engagement portion 140 may further comprise a guide cylinder 170, as illustrated in FIGS. 5-6, wherein the guide cylinder extends radially outward from the hollow cylinder 130 to define a guide cylinder diameter 172. The guide cylinder 170, for example, extends axially from the intermediate location 134 to the flange 142, whereby the guide cylinder diameter 170 generally provides a clearance fit with an internal diameter 174 of the second tank opening 112 shown in FIG. 4.

Further, in accordance with yet another example, the gage mount portion 162 may comprise two or more flats 176, as illustrated in FIGS. 7-8. The two or more flats 176, for example, extend along a respective two or more planes 178 that are generally parallel to the axis 124, whereby the two or more flats are configured to define wrench engagement portions 180 for the selective coupling of the body 116 to the first tank opening 106 of FIG. 3 with a wrench (not shown). Alternatively, while not shown, the two or more flats 176 may be provided in second tank engagement portion 140, such as in the guide cylinder 170 of FIG. 4. As such, the guide cylinder 170, instead of being round, may be similar in shape to that shown in FIG. 7. In yet another alternative, one or more of the guide cylinder 170 and gage mount portion 162 may be square, hexagonal, or other polygonal shape.

Figure 3:
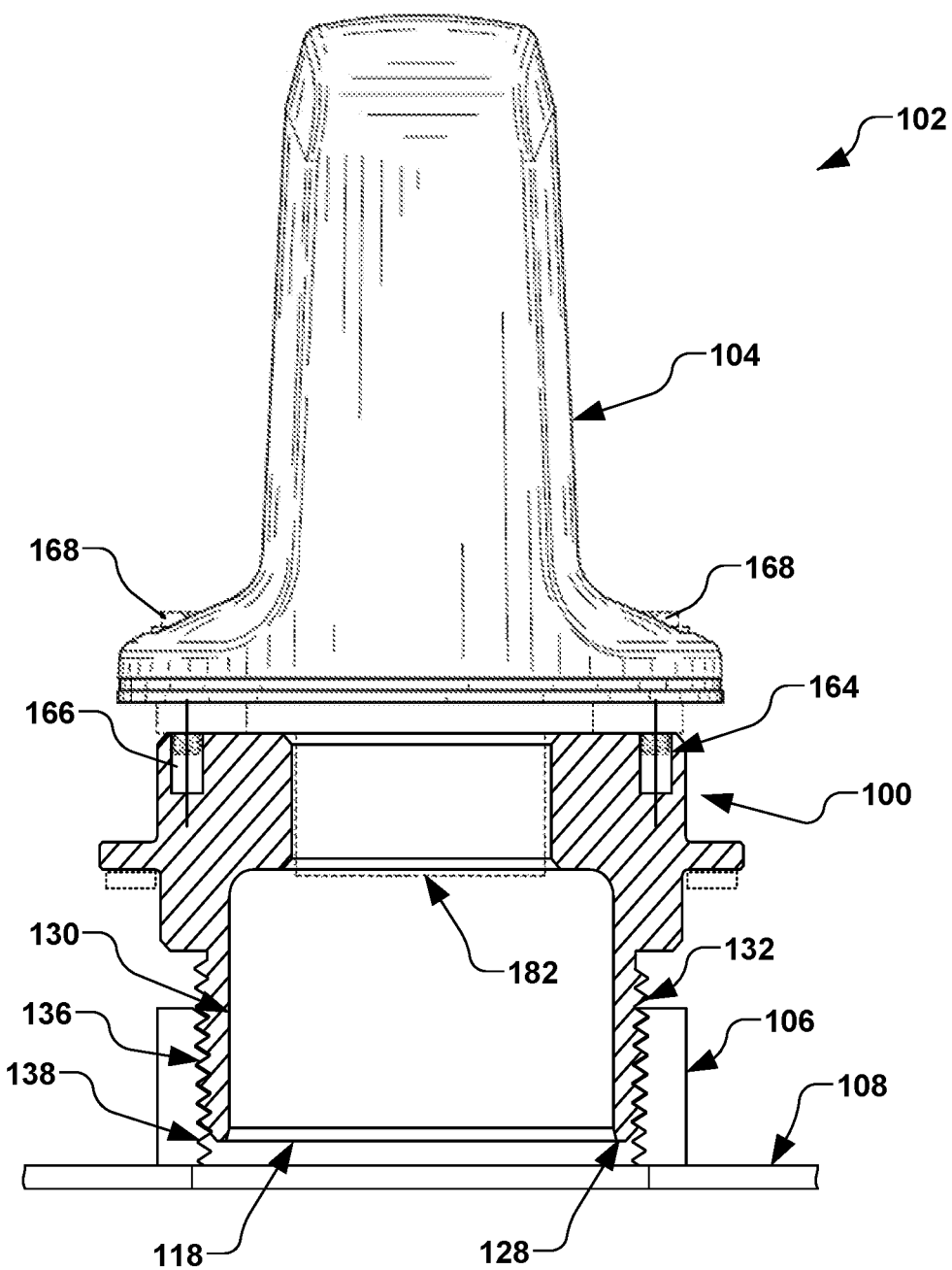
FIG. 3 is a partial cross-sectional view of an exemplified adaptor apparatus coupled to a first tank in a first configuration according to various aspects of the present disclosure.
Figure 4:
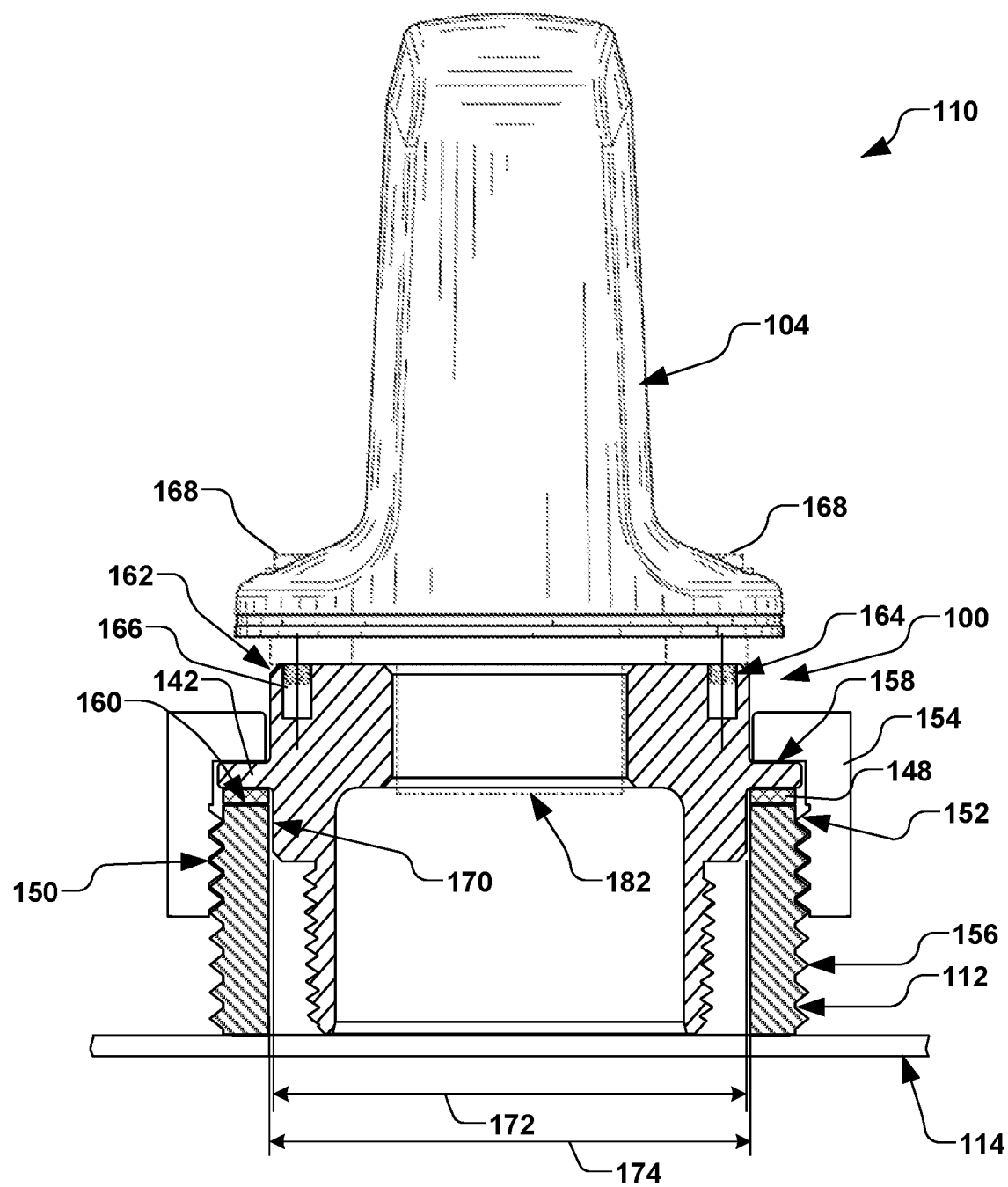
FIG. 4 is a partial cross-sectional view of an exemplified adaptor apparatus coupled to a second tank in a second configuration according to various aspects of the present disclosure.

It shall be further understood that the level gage 104 of FIGS. 3-4, for example, may comprise any variety of sensor, such as one of an ultrasonic sensor, a mechanical float sensor, and an electronic sensor. For example, in the case of the level gage 104 comprising an ultrasonic sensor, a transducer 182 associated with the sensor is configured to pass through at least a portion of the axial hole 122 in the body 116, as well as through the radially-inwardly protruding collar 158 when utilized in the second configuration 110 of FIG. 4.

Although the disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several embodiments, such feature may be combined with one or more other features of the other embodiments as may be desired and advantageous for any given or particular application.

What is claimed is:

1. A tank adapter apparatus, comprising:
   a body having a first end, a second end, and an axial hole extending from the first end to the second end along an axis, wherein the body further comprises:
      a first tank engagement portion comprising a hollow cylinder having an external tapered thread, wherein the external tapered thread extends from approximately the first end of the body to an intermediate location between the first and second ends of the body;
      a second tank engagement portion extending radially outward from the hollow cylinder proximate to the intermediate location, the second tank engagement portion comprising a flange having a substantially flat surface facing toward the first end of the body, wherein the second tank engagement portion further comprises a guide cylinder, wherein the guide cylinder extends radially outward from the hollow cylinder to define a guide cylinder diameter, wherein the guide cylinder extends axially from the intermediate location to the flange, and wherein the guide cylinder diameter provides a clearance fit with an internal diameter of the second tank opening; and
      a gage mount portion associated with the second end of the body, wherein the gage mount portion comprises one or more gage mounting features configured to selectively couple a level gage to the body; and
   a gasket configured to mate with the substantially flat surface of the flange.

2. The tank adapter apparatus of claim 1, wherein the body further comprises two or more flats extending along a respective two or more planes that are generally parallel to the axis.

3. The tank adapter apparatus of claim 2, wherein one or more of the gage mount portion and the second tank engagement portion comprise the two or more flats, whereby the two or more flats are configured to define wrench engagement portions for the selective coupling of the body to the first tank opening.

4. The tank adapter apparatus of claim 1, wherein the one or more gage mounting features comprise one or more threaded holes defined in the second end of the body, and wherein the level gage comprises one or more screws operably coupled thereto and configured to selectively engage the one or more threaded holes, respectively.

5. A tank adapter apparatus, comprising:
   a collar nut, wherein the collar nut comprises an internal straight thread and a radially-inwardly protruding collar;
   a body having a first end, a second end, and an axial hole extending from the first end to the second end along an axis, wherein the body further comprises:
      a first tank engagement portion comprising a hollow cylinder having an external tapered thread, wherein the external tapered thread extends from approximately the first end of the body to an intermediate location between the first and second ends of the body, wherein the first tank engagement portion is configured to selectively couple the body to a first tank opening by a first threaded engagement between the external tapered thread of the hollow cylinder and an internal tapered thread of the first tank opening;
      a second tank engagement portion extending radially outward from the hollow cylinder proximate to the intermediate location, the second tank engagement portion comprising a flange having a substantially flat surface facing toward the first end of the body, and wherein the second tank engagement portion is configured to selectively couple the body to a second tank opening by a second threaded engagement between the internal straight thread of the collar nut and an external straight thread of the second tank opening; and
      a gage mount portion associated with the second end of the body, wherein the gage mount portion comprises one or more gage mounting features configured to selectively couple a gage to the body; and a gasket configured to mate with the substantially flat surface of the flange, wherein the radially-inwardly protruding collar of the collar nut compresses the gasket between the flange and a top rim of the second tank opening.

6. The tank adapter apparatus of claim 5, wherein the second tank engagement portion further comprises a guide cylinder, wherein the guide cylinder extends radially outward from the hollow cylinder to define a guide cylinder diameter, wherein the guide cylinder extends axially from the intermediate location to the flange, and wherein the guide cylinder diameter provides a clearance fit with an internal diameter of the second tank opening.

7. The tank adapter apparatus of claim 5, further comprising a level gage, wherein the one or more gage mounting features are configured to selectively secure the level gage to the gage mount portion.

8. The tank adapter apparatus of claim 7, wherein the one or more gage mounting features comprise one or more threaded holes defined in the second end of the body, and wherein the level gage comprises one or more screws operably coupled thereto and configured to selectively engage the one or more threaded holes, respectively.

9. The tank adapter apparatus of claim 7, wherein the level gage comprises an ultrasonic level gage comprising a transducer, wherein the transducer is configured to extend through at least a portion of the axial hole in the body.

10. The tank adapter apparatus of claim 5, wherein the body further comprises two or more flats extending along a respective two or more planes that are generally parallel to the axis.

11. The tank adapter apparatus of claim 5, wherein the gasket is comprised of a resilient material.

12. A tank adapter apparatus for selectively mounting a level gage to one of a first tank opening having an internal tapered thread and a second tank opening having an external straight thread and a top rim, the tank adapter apparatus comprising:
   a gasket;
   a collar nut having an internal straight thread and a radially-inwardly protruding collar; and
   a body having a first end, a second end, and an axial hole extending from the first end to the second end along an axis, wherein the body further comprises:
      a first tank engagement portion comprising a hollow cylinder having an external tapered thread extending from approximately the first end of the body to an intermediate location between the first and second ends of the body, wherein the body is configured to be selectively coupled to the first tank opening by a first threaded engagement between the external tapered thread of the hollow cylinder and the internal tapered thread of the first tank opening;
      a second tank engagement portion extending radially outward from the hollow cylinder proximate to the intermediate location, the second tank engagement portion comprising a flange having a substantially flat surface facing toward the first end of the body, wherein the gasket is configured to mate with the substantially flat surface of the flange, and wherein the body is configured to be selectively coupled to the second tank opening by a second threaded engagement between the internal straight thread of the collar nut and the external straight thread of the second tank opening, wherein the radially inwardly-protruding collar of the collar nut compresses the gasket between the flange and the top rim of the second tank opening; and
      a gage mount portion associated with the second end of the body, wherein the gage mount portion comprises one or more gage mounting features configured to selectively couple the level gage to the body.

13. The tank adapter apparatus of claim 12, wherein the level gage comprises one of an ultrasonic sensor, a mechanical float sensor, and an electronic sensor.

14. The tank adapter apparatus of claim 12, wherein the one or more gage mounting features comprise one or more threaded holes, and wherein the level gage comprises one or more screws operably coupled thereto and configured to selectively engage the one or more threaded holes.

15. The tank adapter apparatus of claim 12, wherein the level gage comprises an ultrasonic level gage comprising a transducer, wherein the transducer is configured to pass through at least a portion of the axial hole in the body.

16. The tank adapter apparatus of claim 12, wherein one or more of the gage mount portion and second tank engagement portion comprise two or more flats extending along a respective two or more planes that are generally parallel to the axis, whereby the two or more flats are configured to define wrench engagement portions for the selective coupling of the body to the first tank opening.

17. A tank adapter apparatus configured to be selectively coupled to one of a first tank opening having an internal tapered thread and a second tank opening having an external straight thread and a top rim, the tank adapter apparatus comprising:
   a level gage;
   a gasket;
   a collar nut having an internal straight thread and a radially-inwardly protruding collar; and
   a body having a first end, a second end, and an axial hole extending from the first end to the second end along an axis, wherein the body further comprises:
      a first tank engagement portion comprising a hollow cylinder having an external tapered thread extending from approximately the first end of the body to an intermediate location between the first and second ends of the body, wherein the body is configured to be selectively coupled to the first tank opening by a first threaded engagement between the external tapered thread of the hollow cylinder and the internal tapered thread of the first tank opening;
      a second tank engagement portion extending radially outward from the hollow cylinder proximate to the intermediate location, the second tank engagement portion comprising a flange having a substantially flat surface facing toward the first end of the body, wherein the gasket is configured to mate with the substantially flat surface of the flange, and wherein the body is configured to be selectively coupled to the second tank opening by a second threaded engagement between the internal straight thread of the collar nut and the external straight thread of the second tank opening, wherein the radially inwardly-protruding collar of the collar nut compresses the gasket between the flange and the top rim of the second tank opening; and
      a gage mount portion associated with the second end of the body, wherein the gage mount portion comprises one or more gage mounting features configured to selectively couple the level gage to the body.

18. The tank adapter apparatus of claim 17, wherein the level gage comprises an ultrasonic level gage comprising a transducer, wherein the transducer is configured to pass through at least a portion of the axial hole in the body and radially-inwardly protruding collar.

19. The tank adapter apparatus of claim 17, wherein one or more of the gage mount portion and second tank engagement portion comprise two or more flats extending along a respective two or more planes that are generally parallel to the axis, whereby the two or more flats are configured to define wrench engagement portions for the selective coupling of the body to the first tank opening.

20. The tank adapter apparatus of claim 17, wherein the gasket is comprised of a resilient material.

* * * * *